United States Patent

Bouricius et al.

[15] 3,665,174

[45] May 23, 1972

[54] ERROR TOLERANT ARITHMETIC LOGIC UNIT

[72] Inventors: Willard G. Bouricius, Katonah, N.Y.; William C. Carter, Ridgefield, Conn.; Keith A. Duke, Wappingers Falls, N.Y.; John P. Roth, Ossining, N.Y.; Peter R. Schneider, Peekskill, N.Y.

[73] Assignee: International Business Machines Corporation, Armonk, N.Y.

[22] Filed: Sept. 3, 1968

[21] Appl. No.: 756,817

[52] U.S. Cl. ...............................235/153, 307/204, 307/219

[51] Int. Cl. ........................................................G06f 11/04

[58] Field of Search ...........................307/204, 219; 235/153

[56] References Cited

UNITED STATES PATENTS 3,235,842 2/1966 Roth et al. .........................307/204 X

*Primary Examiner*—Benjamin A. Borchelt
*Assistant Examiner*—N. Moskowitz
*Attorney*—Lawrence E. Laubscher

[57] ABSTRACT

The error tolerant arithmetic logical unit is divided into vertical bit-planes which are relatively independent, being coupled mainly for the purposes of shifts and carry propagation. The system tolerates failures and still functions correctly by reconfiguring the unit through the control of interplane connections. By inserting a spare bit-plane into the system and switching between bit-planes to bypass a failed plane, the effect of the failed plane or of a failure in a position of control logic can be eliminated.

8 Claims, 9 Drawing Figures

INVENTORS
Willard G. Bouricius
William C. Carter
Keith A. Duke
John P. Roth
Peter R. Schneider BY Lawrence E. Laubscher
ATTORNEY

ERROR TOLERANT ARITHMETIC LOGIC UNIT

As suggested by the U.S. Pat. to Rosenfeld No. 3,178,586, it has been proposed in the patented prior art to provide self correcting logic circuitry by employing the broad concept of path reconfiguration. Rosenfeld discloses a self correcting shift register distributor wherein following detection, the stages are reset to re-establish a pre-existing sequence of distributed control signals.

The prior art does not provide for failure of a bit-plane or logical block within an arithmetic logical unit. A logical circuit composed of several logical blocks will operate to perform a programmed logical function as long as each circuit block operates effectively. However, failure of any individual block eliminates a bit position and the complete circuit fails.

The present invention was developed to provide a logical unit which includes a spare bit position to replace a failed block or bit-plane without causing circuit interruption. An improved controlled switching system rapidly accomplishes circuit reconfiguration when an error is detected to eliminate the failed position and to insert the spare.

Accordingly, the primary object of the present invention is to provide an error tolerant arithmetic logical unit wherein failures of either control logical units or of individual bit positions are eliminated by replacing the faulty unit with a spare. Separate selection means are associated with the inputs and outputs of each bit position and additional selection circuitry is provided for bypassing the bad position in such areas as carry propagation and shifting.

A more specific object of the invention is to automatically provide circuit reconfiguration of an arithmetic logical unit without interruption by controlled selection units which exclude a faulty component and insert a replacement. Register means operable by conventional diagnostic programs or error code correction techniques serve to so control the selection means that logical operation is shifted from a faulty to a spare bit position immediately upon detection of a fault.

The foregoing and other objects, features and advantages of the invention will be apparent from the following more particular description of a preferred embodiment of the invention, as illustrated in the accompanying drawings, in which.

An arithmetic logical unit can be designed so that it is segmented into bit-planes which are relatively independent. That is, each of *m* single digital bit positions is relatively independent of circuitry associated with any other bit position, and the circuitry for each bit position forms a vertical bit-plane. Each bit-plane must, however, be interconnected to an extent which will permit shifting and carry propagation signals to pass between adjacent bit-planes.

Figures 1, 2, 3:
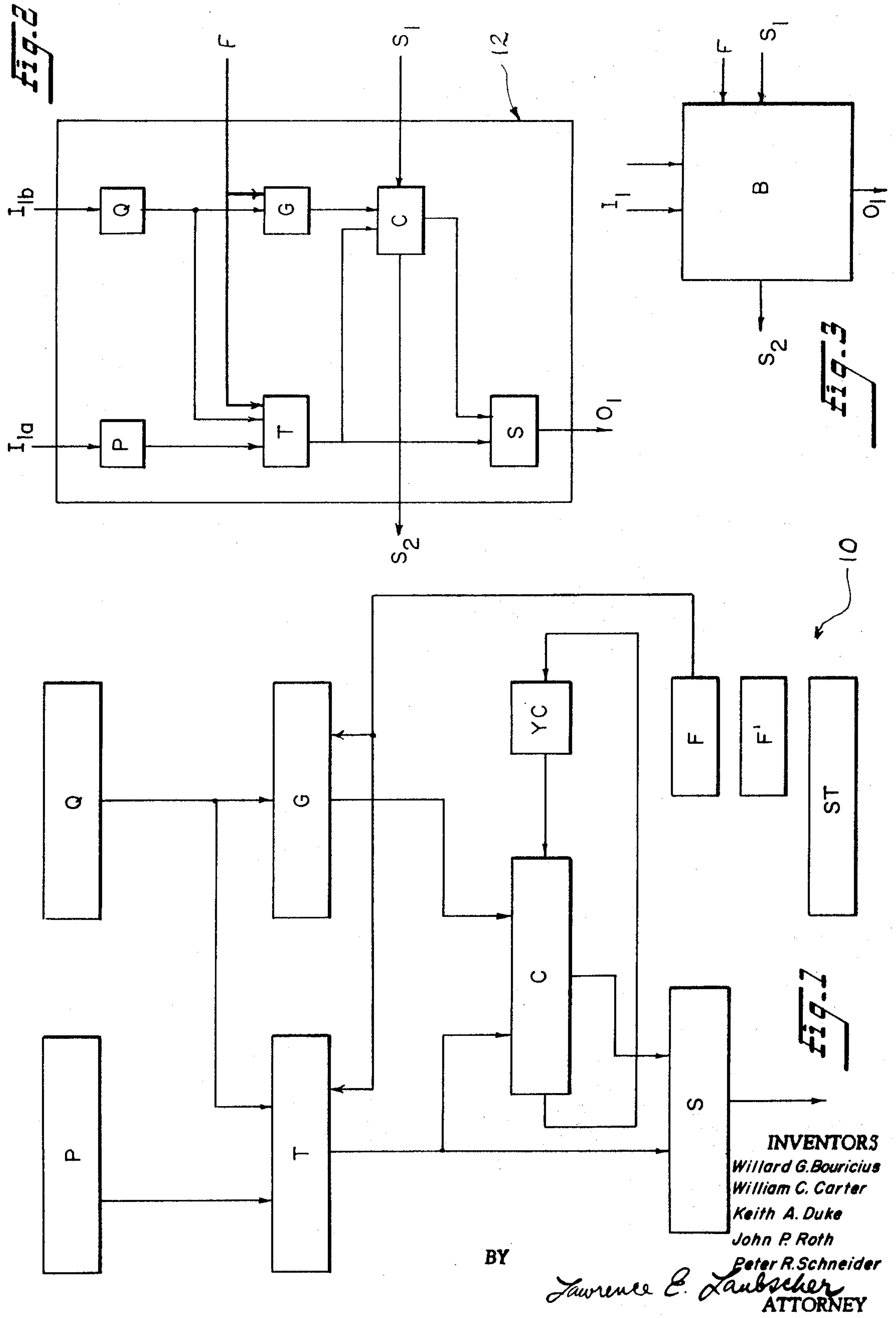
FIG. 1 is a block diagram of a Byte Arithmetic Logical Unit (BALU) of a type adapted to employ error tolerance.
FIG. 2 is a block diagram of a single bit-plane of the unit of FIG. 1.
FIG. 3 is a simplified diagram of the single bit-plane of FIG. 2.

FIG. 1 illustrates an eight-bit Byte Arithmetic Logical Unit (BALU) indicated at 10 which may be modified to incorporate the present invention. This BALU follows substantially the design and operation of the 360/Model 40 Arithmetic Logical Unit manufactured by International Business Machines Corporation, and therefore only a brief description of the unit will be provided. It should be noted that the present invention can apply to units other than a BALU, and the unit 10 is used herein only for purposes of illustration.

For error detection, the BALU 10 is constructed using two wire logic, and at the input, data is transformed from parity checked to two wire logic information. The BALU carries out arithmetic operations using two wire logic for checking its operations. The checked information is then transformed from two wire form back to parity checked form and transmitted over the multiplexed bus.

The BALU is normally an eight bit wide device capable of digital addition, subtraction, shifting, and various logical operations, such as AND, OR, EQUALS, and EXCLUSIVE OR, among others. P and Q form input registers for the unit while a register T generates any function of two variables. A register G performs pass through, complement, two bit right shift (end around) or all zero output operations while a register S performs an EXCLUSIVE OR function. A register C contains the carry circuitry while a register YC, which is a one bit register, is the carry buffer and is also used for communication between BALUs. A register F is a four bit register which contains the function code for the BALU and is used to provide function control to both T and G.

In accordance with a preferred embodiment of the present invention, the basic eight bit BALU 10 is modified to incorporate a spare bit position in each of the registers P,Q,T,G,C and S, and the register YC will be TMR (triple modular redundancy) for error tolerance. Also function register F is duplicated with a register F′ (four bit positions) and a status register ST is added to control circuit reconfiguration in case of bit-plane failure.

The nine bit positions in the modified BALU 10 are arranged into single vertical bit-planes of the type indicated at 12 in FIG. 2. The blocks P,Q,T,G,C, and S have a similar function in both FIGS. 1 and 2, but the blocks and data paths of FIG. 2 are only one bit wide. Later it will be shown that the error tolerant unit can be designed to use blocks of width greater than one bit.

With nine vertical bit-planes 12 in the modified BALU 10 of FIG. 1, an error detected in one of the registers F and F′ and/or in one of the nine bit planes 12 will result in one or more bits being set into the status register ST. The status register includes nine bit positions; one to operate either register F or F′, and the remaining eight to operate electronic logical error compensation circuitry to be subsequently described.

The internal operation of the single bit-plane 12 is of no further consequence in defining the structure and operation of the present invention, and the entire bit-plane will therefore be illustrated as a block 14, FIG. 3 with inputs T1, S1 and F and outputs O1 and S2. The basic BALU 10 of FIG. 1, when divided into eight separate bit-planes, may be depicted by employing eight blocks 14 of FIG. 3 (B1 – B8) as illustrated at 16 in FIG. 4. This circuit will operate properly until a single component fails causing one of the bit-planes B to malfunction. Once this happens, the entire BALU will be inoperative.

Figure 5:
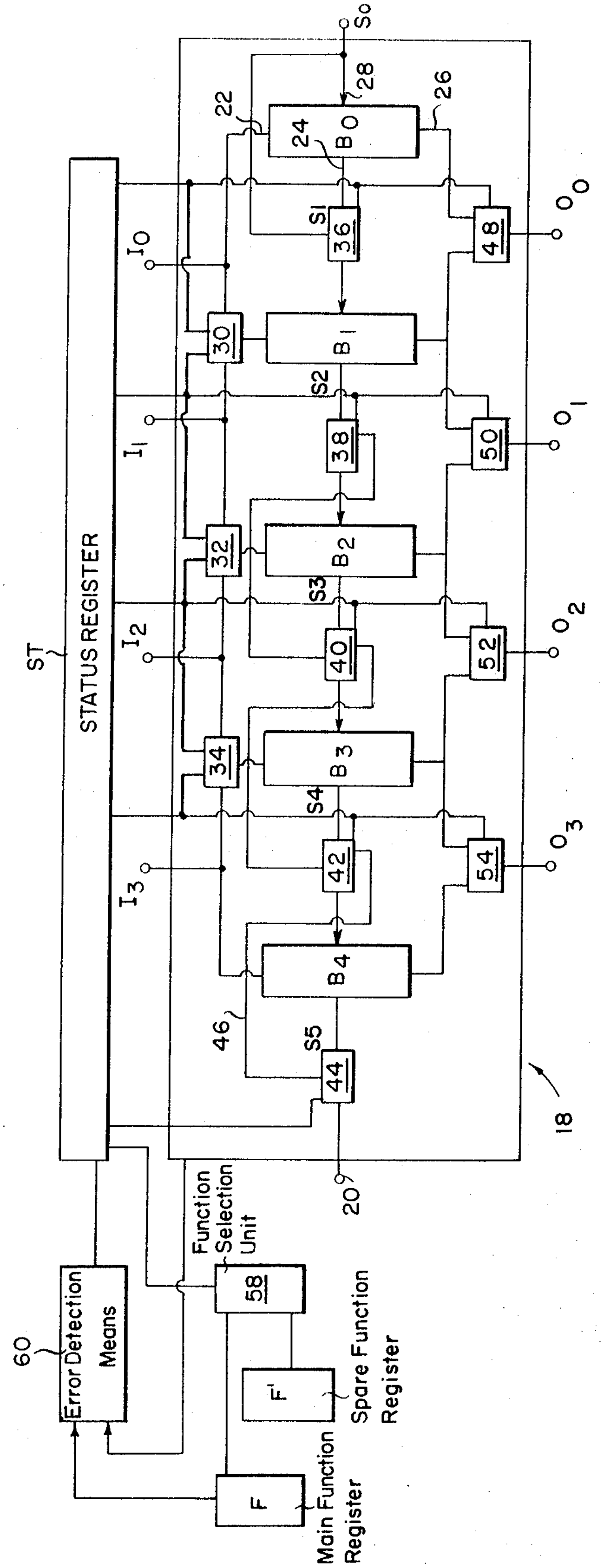
FIG. 5 is a block diagram illustrating the error tolerant arithmetic logical unit of the present invention.

FIG. 5 illustrates an error tolerant arithmetic logical unit 18 which, for illustrative purposes, includes four normally operative bit positions provided by logic blocks B1 – B4 and a spare logic block B0 forming a spare bit position. This circuit performs its logical function on data inputs I0, I1, I2 and I3 and a control input S0, has a control output 20 and data outputs O0, O1, O2 and O3.

Each logic block B0 – B4 is identical to the remaining blocks, and considering block B0 for purposes of description, it will be noted that each logic block includes a data input 22, a first output 24 for shift and carry propagation signals (S1–S4), a second output 26 for data output signals, and a control input 28. The control input of the block B0, which forms the first bit position for the circuit 18, receives the control input signal S0 during normal circuit operation, and the remaining normally operative blocks receive the first output signal from the preceding block at control input 28. The first output from the block B3 is normally connected to the control output 20 in a manner to be subsequently described.

For normal circuit operation, the logic blocks B0 – B3 will receive the data input signals from inputs I0 – I3. These signals are provided to the block inputs 22 by input selection units 30, 32, and 34. It will be noted that the data signal from input I3 is directly coupled to the input of the spare logic block B4, but normally the output of this block is deactivated.

The routing of the first output signals (S1 – S5) from each of the logic blocks B0 – B4, as well as the path taken by the signal from the control input S0 is determined by control selection units 36, 38, 40, 42 and 44. For normal operation, selection unit 36 causes the control signal on input S0 to pass to the input 28 of block B0, and the first output signal S1 to pass to the input of block B1. Similarly, the selection units 38 and 40 pass the first output signals S2 and S3 to the inputs of blocks B2 and B3, while the selection units 42 and 44 permit the first output signal S4 from the block B3 to follow a bypass line 46 around the block B4 to the control output 20.

The data output signals from the logic block outputs 26 are routed by second output selection units 48, 50, 52 and 54. For normal operation, only the output signals from logic blocks B0– B3 are connected to the outputs O0 – O3, and selection unit 54 blocks the output from spare logic block B4.

Figure 6:
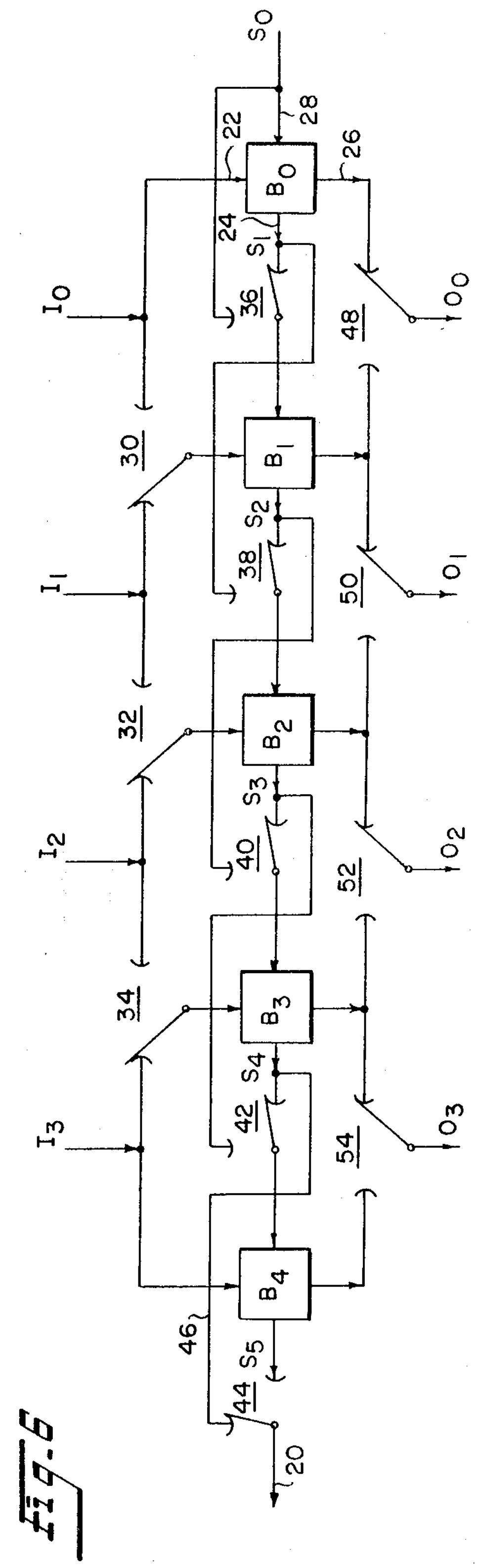
FIG. 6 is a diagrammatic illustration showing a switching equivalent of the selection means for accomplishing circuit reconfiguration.
Figure 7:
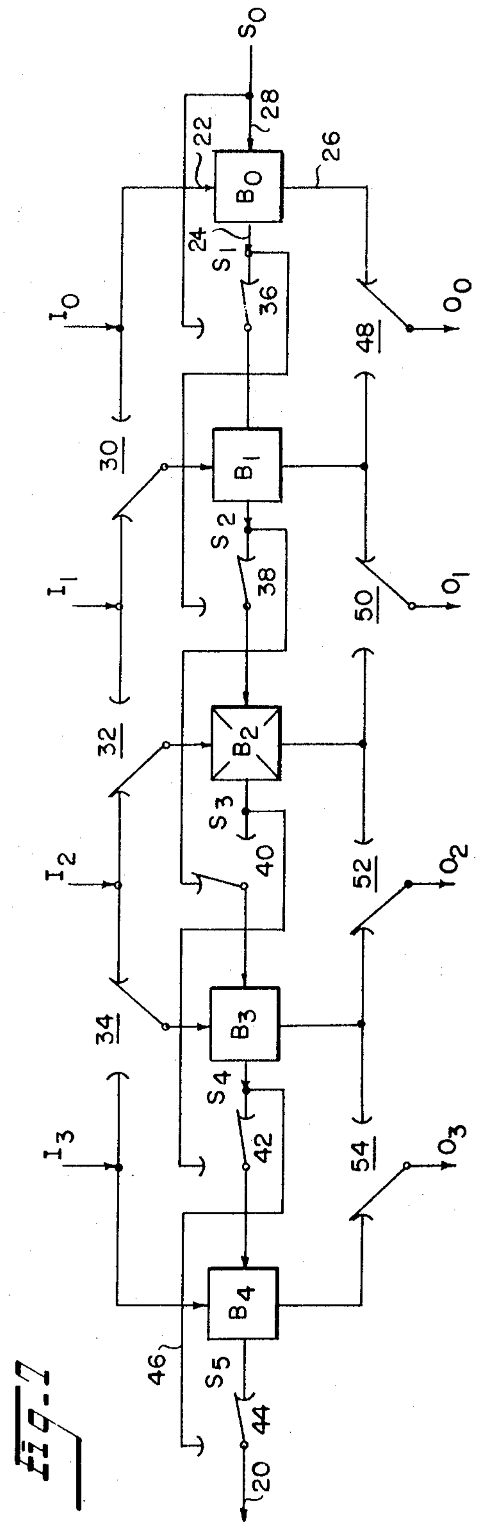
FIG. 7 is the diagrammatic illustration of FIG. 6 showing the circuit configuration after a bit position failure.

The operation of the input, output and control selection units during normal operation of the circuit 18 and upon occurrence of a failure in one of the normally operative logic blocks may be better understood by referring to the diagrams of FIGS. 6 and 7. In these FIGS., the selection units are depicted, for purposes of illustration, as two position switches.

In FIG. 6, if the four blocks B0, B1, B2,B3 are all good, they are configured into the circuit by throwing switches, 48, 36, 30, 50, 38, 32, 52, 40, 34, 54, 42 and 44 to the positions shown. This would also be the case if blocks B0, B1, B2, and B3 are good and B4 is faulty. For either of these two conditions, normal operation takes place. Note that the two outputs of block B4 are not used, due to the positions of switches 44 and 54. Thus block B4 is effectively out of the circuit.

If it is assumed that block B4 is good and one of the other four logic blocks fails, the failed block must be reconfigured out of the operational circuit, and the data paths switched so as to utilize the spare, which in this case, is considered to be block B4. As an example, consider the case where block B2 is found to have failed as is illustrated in FIG. 7. In this situation, all switches associated with blocks to the right of the failed block, that is switches 30, 32, 48, 50, 36 and 38, are in their original positions. The position of switch 42 is also unchanged. Switches 52, 54, 40, 44 and 34, however, are thrown to their alternate positions. Thus, inputs I0 and I1 pass through blocks B0 and B1, and continue on to become O0 and O1, respectively, just as in FIG. 6. The data path of input I2 should no longer go through block B2, because it is faulty. To this end, switches 34 and 52 are thrown so as to route I2 through block B3. Switch 54 now permits input I3 to pass through block B4 to become output O3.

In the case of the S-signals, S0 passes through block B0, to become S1, which is passed by switch 36 to block B1. The S2 output of this block, is permitted by switch 40 to pass around the faculty block, B2, and enter block B3 and at the same time, the S3 output of block B2 is inhibited. S4, coming out of block B3, is passed by switch 42 to block B4. This time, switch 44 is in the "down" position, permitting the passage of S5 out of block B4.

With the configuration of FIG. 7, the faulty block B2 is effectively switched out of the circuit 18 and the functions of blocks B2 and B3 are taken over by blocks B3 and B4, the spare block. Similarly, any of the normally operating blocks B0, B1, B2, or B3 may be switched out of the circuit, if a single failure occurs, and block B4, the spare, switched in to retain the full component count and proper functioning of the circuit. This circuit is shown for explanation only and is neither an example of a reliable configuration, nor does it restrict the possible implementation of the concept involved to just four blocks with one spare to handle a single fault.

In the case where there are *q* B-blocks and *m* spares, the switching could be arranged so as to handle up to and including *m* faulty B-blocks by permitting the S-signals to enter any one of $m+1$ adjacent blocks positions. The same would have to be true for the I-signals.

Returning now to FIG. 5, a function register F provides an operational function code for the arithmetic logical unit 18 and, if register F fails, the function code is furnished by a spare function register F'. A function selection unit 58 selects the code from either the register F or the register F' and supplies the selected code to each of the B-blocks. While a single unit 58 is shown in FIG. 5, this is a schematic representation only, and for improved reliability, a separate function selection unit 58 would be provided for each of the B-blocks.

An error detection means 60 senses a logic block failure or failure of an operating function register and controls the coding of a status register ST. The status register in turn controls the operation of the function, input, output and control selection units to insert a spare unit into the logical circuit.

Figure 9:
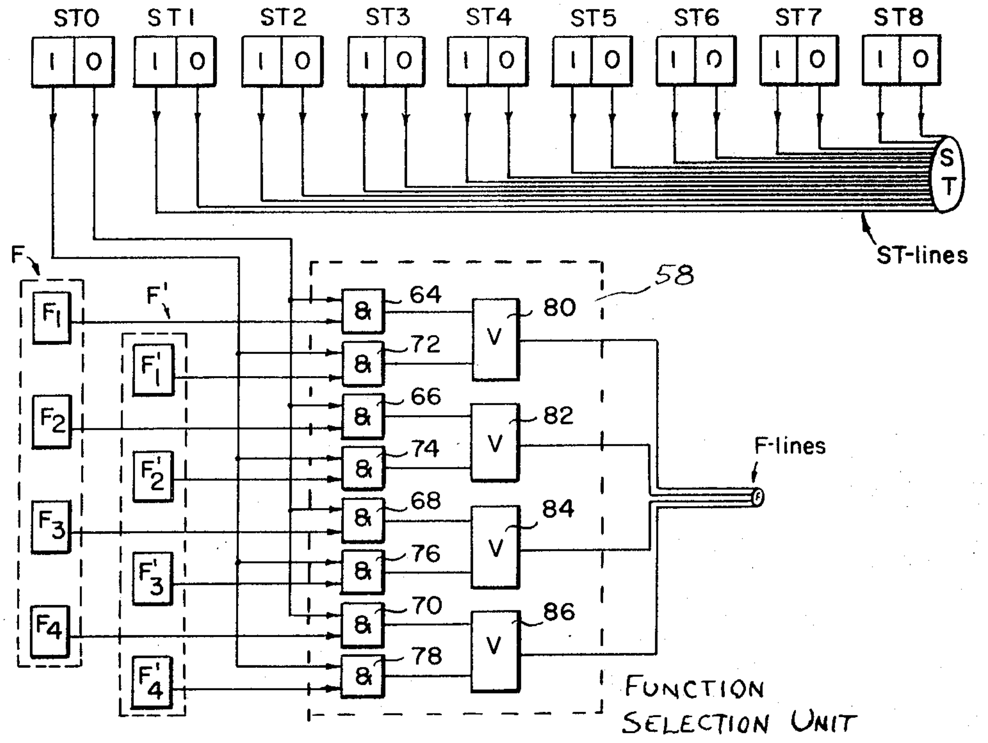
FIG. 9 is a detailed logic diagram of the selection control and logic function control units for the arithmetic logical unit of the present invention.
Figure 8:
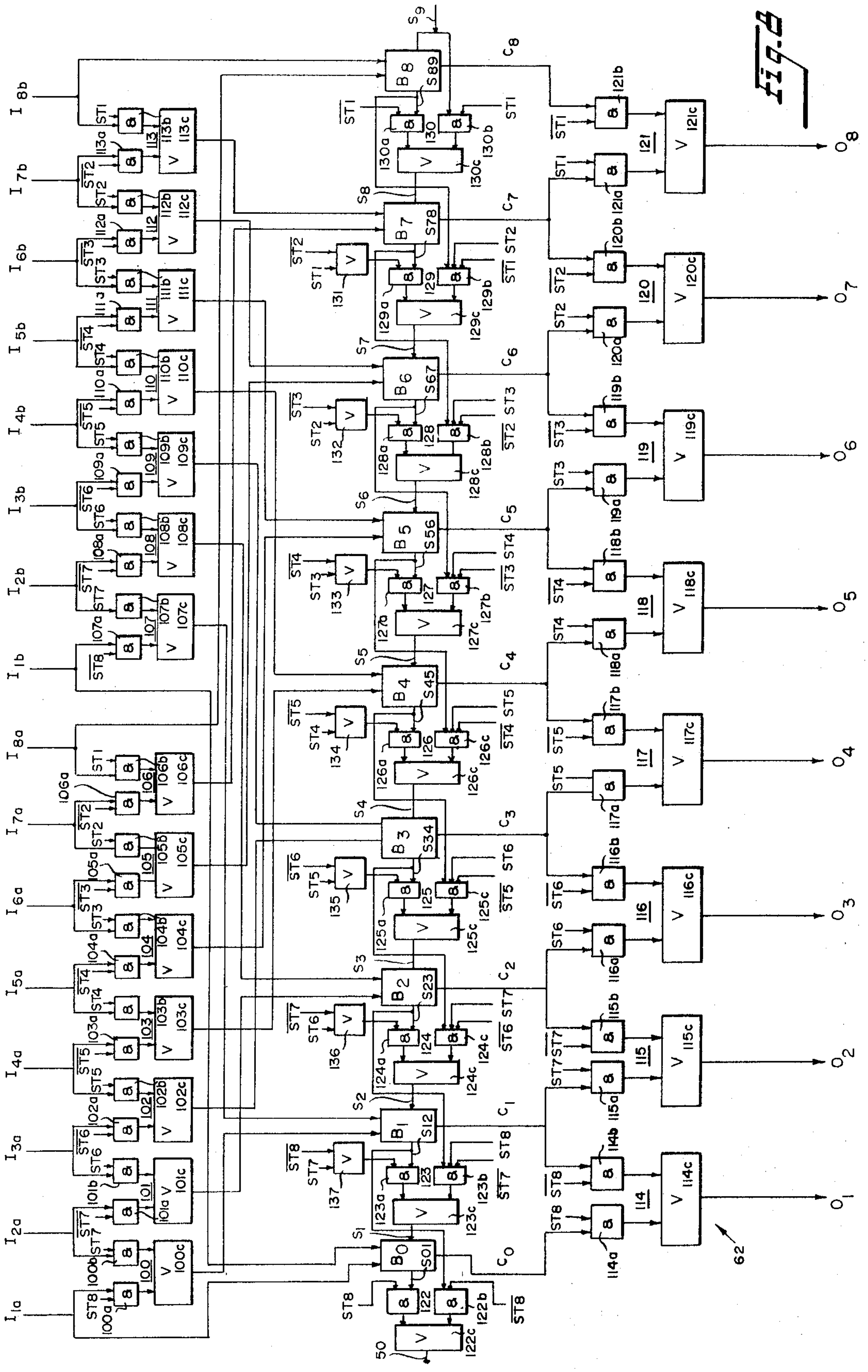
FIG. 8 is a detailed logic diagram of the logical planes of an eight bit BALU including the selection means for circuit reconfiguration in the event of plane failure.

FIGS. 8 and 9 illustrate a complete error tolerant arithmetic logical unit 62 substituting electronic logic components for the diagrammatic switches of FIGS. 6 and 7. This circuit constitutes an eight bit position BALU similar to that of FIG. 4 which is capable of automatically compensating for a failed logic plane or function register by employing the concepts illustrated by FIGS. 5 – 7.

Figure 4:
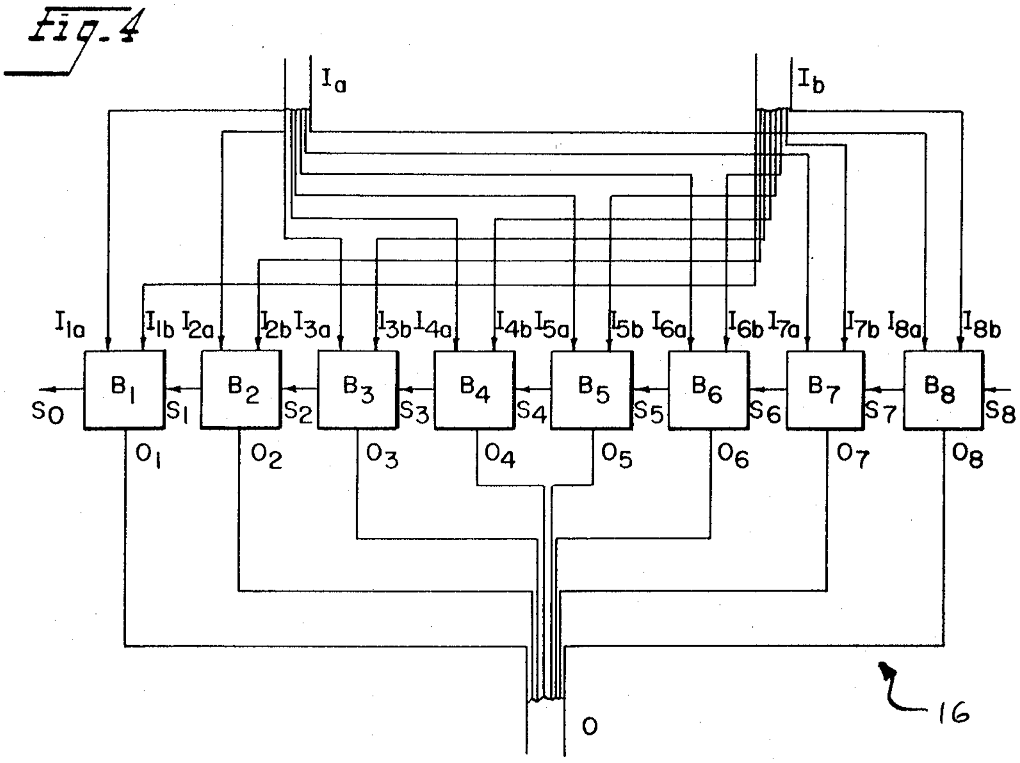
FIG. 4 is a block diagram of an eight bit BALU without error tolerance.

In FIG. 8, the individual vertical bit-planes include blocks B1 through B8 which correspond to the same blocks in FIG. 4. The added bit position is shown as block B0, on the left, although any of blocks could function as the spare.

The circuitry surrounding each block (B0 – B8) and the circuitry in-line with the inputs and the outputs therefor perform the same function for the unit 62 as was performed in FIG. 6 and 7 by the switches. The only difference is that in FIG. 8, AND-OR circuitry forms a set of logical switches which route the path of a signal around any one block, if it is discovered that that block has failed. These "switches" are controlled by control signals ST1–ST8, and their complements, which come from nine bit positions of status register ST, shown in detail in FIG. 9. Also, FIG. 9 shows the method for selecting either function register F or F' according to the value of ST0, if an error is detected in the operative function register. The status register ST is set to a different combination depending upon which, if any, of the bit-planes are found to have failed, and which, if any, of the F or F' function registers are faulty, and must therefore be switched out of the operating circuit. As mentioned with respect to FIG. 5, one function selection unit of the type shown in FIG. 9 is provided for each B-block.

Referring now to FIGS. 8 and 9, the first position of status register ST, which is ST0, is put into the "0" state if either function registers F and F' are both good, or if register F is good and register F' is not. If this is not true, that is register F' is good and register F is not, then ST0 is put into the "1" state.

Assuming first that function register F is good, then ST0 will be in the "0" state. The effect of this is to enable AND circuits 64, 66, 68 and 70 and disable AND circuits 72, 74, 76 and 78 in FIG. 9. This will send signals F1, F2, F3, F4 from the function register F, which is a four bit position register, to AND gates 64, 66, 68 and 70 and through OR gates 80, 82, 84 and 86 connected thereto. The outputs of the OR gates are connected to provide the function code for BALU 62.

With function register F operating, the signals F'1, F'2, F'3, F'4 will be inhibited. The exact opposite is true if F should be faulty and register F' good.

It will now be apparent that with a combination of AND and OR gates and appropriate control signals the outputs from either one of a set of two registers may be selected and passed on while inhibiting the other. Thus, this type of logic circuit behaves in a similar fashion to a mechanical single pole double throw switch whose output may be selected from either of two inputs. This same logic circuit is used extensively in FIG. 8 to select between one of two possible input signals.

The functions performed by the circuits of FIG. 8 may be broken down into four major groups. One group is the combination of input AND-OR circuits 100–113, which receive the input signals I1*a*–I8*a* and I1*b*–I8*b*, and pass them on, under the direction of control signals ST1–ST8, to the proper operational blocks, B0–B8.

A second group is the nine B-blocks, B0–B8, which process data coming in on two I-lines, and one S-line and deliver output to one O-line and one S-line, each. This group is the main group that is protected against a failure in one of its members by the surrounding switching circuitry.

A third group consists of the set of AND-OR blocks 122–130 to the left of each B-block. Their function is to pass on to the next B-block (to the left), the output of the associated B-block or, if that B-block or its bit-plane is faulty and is being bypassed, the output from the previous B-block on the right.

The fourth group consists of the set of AND-OR blocks 114 – 121 which serve to pass on to the O1 – O8 outputs, the outputs of the proper B-blocks. These AND-OR blocks chose between one or another of the bit-planes, depending upon the direction specified by the ST control signals.

The setting of the control signals ST1–ST8 in the status register ST depend upon which bit-plane is faulty and therefore is to be made idle by switching it out of the circuit and adding a spare bit-plane to the circuit. The respective settings of the status register which are accomplished by a fault sensing system, are shown in Table 1, below. The normal condition is that of bit-plane 0 being idle.

| Bit-plane Made Idle | ST 1 | ST 2 | ST 3 | ST 4 | ST 5 | ST 6 | ST 7 | ST 8 |
|---|---|---|---|---|---|---|---|---|
| 0 | 0 | 0 | 0 | 0 | 0 | 0 | 0 | 0 |
| 1 | 0 | 0 | 0 | 0 | | 0 | 0 | 1 |
| 2 | 0 | 0 | 0 | 0 | 0 | 0 | 1 | 1 |
| 3 | 0 | 0 | 0 | 0 | 0 | 1 | 1 | 1 |
| 4 | 0 | 0 | 0 | 0 | 1 | 1 | 1 | 1 |
| 5 | 0 | 0 | 0 | 1 | 1 | 1 | 1 | 1 |
| 6 | 0 | 0 | 1 | 1 | 1 | 1 | 1 | 1 |
| 7 | 0 | 1 | 1 | 1 | 1 | 1 | 1 | 1 |
| 8 | 1 | 1 | 1 | 1 | 1 | 1 | 1 | 1 |

To explain the operation of the control signals ST1–ST8 in switching a spare bit-plane into the circuit to replace one that has failed, consider, first, the normal operating state of the circuit of FIG. 8, where bit-planes B 1–8 are operating satisfactorily. In this state, bit-plane B0 is the one which is to be made idle, as it is the spare and is not yet needed. This condition is indicated by the state of the control signals in the first row of Table 1 where ST1–ST8 are all in the "0" state, and the complements thereof are in the "1" state.

The effect of these control signals on each of the previously mentioned groups of circuits in FIG. 8 is as follows.

With regard to the first group, the path taken by a representative input signal, such as I4*b*, will be traced for illustration. This input drives two AND-gates **109*b* and 110*a* which are controlled by ST5 and the complement thereof $\overline{\text{ST5}}$, respectively. Since a control signal and its complement cannot both be "1" or "0" at the same time, either the left AND-gate 109*b* or the right one 110*a*** must be activated, but not both. Therefore, the input, I4*b*, must pass through one of the two AND-gates and thence to either OR-block **109*c* or 110*c***. A similar situation occurs for all I-inputs.

In the situation being considered, bit-plane 0 is idle and all the ST1-St8 signals are in the "0" state. The result of this is to enable the AND-gate that is controlled by the complement of the ST signal (the right-hand or "*a*" gate in each pair), and to disable the remaining AND-gate. I4*b* passes through AND-gate **110*a* to OR-gate 110*c*. The other input to OR-gate 110*c* is not activated since it is fed by the output of AND-gate 110*b*** controlled by ST4, which now has the value of "0."

The output of OR-gate **110*c*** is equivalent to I4*b* and this is the signal which is sent to the right input of block B4. Similarly, I1*b*–I8*b* are sent to the right inputs of blocks B1–B8, and inputs I1*a*–I8*a* are sent to the left inputs of blocks B1–B8. The single exception occurs in the case of blocks B0 and B8 which do not require an input control. No choice need be made because only I1*a* and I1*b* may ever go to block B0, and, similarly, only I8*a* and I8*b* may ever go to block B8. Therefore, these signals are always sent to their respective B-blocks and the inhibiting control is put only on the output side of these B-blocks.

In the case of the outputs of the B-blocks, C0–C8, at most one of each pair of adjacent C-signals can go to each of the output OR-gates, **114*c*–121*c*. Thus, to take a specific example, output O2 is driven from OR-block 115*c*, which, in turn, is fed by two AND-gates 115*a* and 115*b* controlled by ST7 and its complement $\overline{\text{ST7}}$. Again, either ST7 or $\overline{\text{ST7}}$ must be "1" and the other must be "0." Thus either C1 or C2, but not both, must pass through to the output OR-gate 115*c*, and form output signal O2. Under the conditions specified, that is, bit-plane 0 being bypassed, all the ST1–ST8 are in the "0" state. Thus, all of the AND gates 114*b*–121*b* are enabled and all the AND-gates 114*a*–121*a* are disabled. Hence, C1–C8 will feed OR-gates 114*c*–121*c*, respectively, and become O1–O8. The output of the bypassed bit-plane, C0, is completely ignored, as it should be, since it is inhibited by the absence of signal ST8 on the AND-gate 114*a***.

The third functional switching circuit group is the set of AND-OR circuits 122–130 to the immediate left of each B-block. The function of this group of circuits is analogous to the similarly placed mechanical switches in FIGS. 6 and 7, for they either pass the S-output of each B-block to the left and into the next B-block, or they route the signal around one B-block that has been found to be faulty, or whose bit-plane is faulty.

The normal operation of the circuit, under the previously imposed condition that bit-plane 0 is being bypassed, is as follows:

Since the ST1–ST8 are all "0," and the complement $\overline{\text{ST1–ST8}}$ are all "1," signal S9 enters block B8 and emerges as S89, which impinges upon AND-gate **130*a*. At the same time, S9 is also going to AND-gate 130*b*. However, since the "0" state of ST1 inhibits AND -gate 130*b*, the output of gate 130*b* is "0." The AND-gate 130*a* is enabled by $\overline{\text{ST1}}$, and thus passes signal S89 on to OR-gate 130*c*, whose output is designated S8. This signal is fed through block B7 to become S78**.

Signal S89 is also fed to AND-gate **129*b*. It is apparent from the inputs to AND-gate 129*b*** that this gate will be enabled only when $\overline{\text{ST1}}$ and ST2 are both, simultaneously, in the "1" state. Since this is not the case in the situation being considered, this gate is disabled, and the S89 signal does not take this path.

The S78 signal, however, has been fed to AND-gate 129a, which is controlled by the output of OR-gate 131. This output is a "1" whenever either ST1 or $\overline{\text{ST2}}$ is a "1." The latter condition clearly prevails, and therefore the output of OR-gate 131 is a "1." This "1" enables AND-gate **129*a* to pass signal S78 through to the input of OR-gate 129*c*. Since the other input to this OR-gate has been disabled as explained previously, the S78 signal continues on to become S7, at the output of OR-gate 129*c***.

In a similar way, the "S" signal passes through blocks B6–B1, finally emerging as signal S1 at the output of OR-gate **123*c*. This signal, S1, goes to B0 and emerges as SO1. The output of block B1, S12, is also sent to AND-gate 122*b* which is controlled solely by $\overline{\text{ST8}}$. This control signal is in the "1" state, and so the S12 signal passes through to OR-gate 122*c*. The path of the SO1 signal, however, is blocked because AND-gate 122*a* is controlled by ST8, which is "0." This results in a "0" on the output of gate 122*a*, thereby effecting the passage of signal S12 around block B0, to become S0. The entire B0** bit-plane has been bypassed because it is not yet required.

Should a bit-plane become faulty, unit 62 will operate abnormally. As an example, take the case where bit-plane number four is bad, and block B4 must, therefore, be bypassed. This, of course, means that block B0 must be switched into the circuit to compensate for the loss of B4. For this to occur, the control signals ST1–ST8 are set as indicated on the fifth line of Table 1. For convenience, this line is duplicated below.

| Bit-plane Made Idle | ST 1 | ST 2 | ST 3 | ST 4 | ST 5 | ST 6 | ST 7 | ST 8 |
|---|---|---|---|---|---|---|---|---|
| 4 | 0 | 0 | 0 | 0 | 1 | 1 | 1 | 1 |

The effect of these control signals on the circuit of FIG. 8 is as follows.

Note that ST1, ST2, ST3, and ST4 are still in the "0" state just as they were when bit-plane 0 was to be bypassed as in the previous example. Therefore the signal paths which are controlled by these ST-signals only are unchanged from the previous case. Thus input signals I5*a*–I8*a* and I5*b*–I8*b* take the paths through the right-hand of the two AND-gates (104*a*, 105*a*, 106*a* and 111*a*, 112*a*, 113*a*) to which each is fed, except for I8*a* and I8*b*, which go directly. Thus I5*a* and I5*b* go to B5, I6*a* and I6*b* go to B6, I7*a* and I7*b* go to B7, and I8*a* and I8*b* go to B8, as before.

Similarly, the outputs of B5–B8 (C5–C8) are all permitted to pass through those AND-gates in their paths which are controlled by the complement of the ST-signals or, in other words, C5 goes through AND-gate 118*b* and OR-gate 118*c* to become O5. Similarly, C6 becomes O6, C7–O7 and C8–O8.

The paths of the S-signals in the situation are also unchanged from their previous state, only up to and including S5, the output of OR-gate 127*c*. It is at this point, and for all signal paths to the left, that the new situation has a marked effect.

First, I4a does not now take its former path through OR-gate 103*c* and thence to B4. This is because $\overline{ST5}$ is a "0," thereby blocking the right-hand AND-gate 103*a* and the path through OR-gate 103*c*. Instead, ST5 is a "1" thereby enabling the left-hand AND-gate 102*b* and completing a path through OR-gate 102*c*, by means of the right input thereof. There is no interference from the left input of OR-gate 102*c* because the "0" value of $\overline{ST6}$ effectively inhibits the output of the right-hand AND-gate 102*a* connected to I3*a*. Thus OR-gate 102*c* sees only I4*a* which is sent on to block B3.

ST6, ST7, and ST8 are also "1" and the data-paths that they control carry I3a through OR-gate 101*c* to block B2, I2*a*, through OR-gate 100*c* to block B1, and I1*a* directly to block B0. In a similar way, I1*b*–I4*b* are sent through blocks B0–B3, respectively. Note that no inputs are being sent to the faulty block, B4.

On the output side of the B-blocks, C4 cannot pass through AND-gate 118*a* because ST4 is a "0," similarly it cannot pass through AND-gate 117*b* because $\overline{ST5}$ is a "0." Thus no output is used from the faulty B4 block.

AND-gate 117*a* is controlled by ST5, which is a "1," so C3 can pass through to become O4, and C2 becomes O3. C1 becomes O2 and C0 passes through AND-gate 114*a* to OR-gate 114*c* and then becomes O1.

The effect of the ST-control signals on the I-inputs and the O-outputs is to shift all signals including and to the left of the faulty bit-plane one position to the left, thereby leaving the failed unit out of the active circuit, and placing the spare unit into active operation in the circuit.

In the case of the S-signals, S5 is sent through B4 to become S45 at AND-gate 126*a* and S56 is also sent around B4, directly to AND-gate 126*b*. This AND-gate is controlled by signals $\overline{ST4}$ and ST5, and previously the effect of these signals was to block the path of S56.

Now, however, the state of $\overline{ST4}$ is a "1" and ST5 is also a "1" thereby enabling this path and passing S56 through AND-gate 126*b* to the OR-gate 126*c*. The path of S45, on the other hand, is controlled by the other input to AND-gate 126*a*, which depends on the OR combination of ST4 and $\overline{ST5}$ at OR-gate 134. In this instance, they are both "0," and the path is therefore blocked by gate 126*a*, permitting S56 to travel around the faulty B4 and become S4 at the output of gate 126*c*.

From this point, on to the output of OR-gate 123*c*, the data-path is identical to what it was in the first example. That is, B3, B2, and B1 are not bypassed. The path of S1, however, has changed. Previously, ST8 was a "0," blocking the output of B0 (SO1) from reaching OR-gate 122*c*. Now ST8 is a "1" and $\overline{ST8}$ is a "0," so that AND-gate 122*b* is blocked, and AND-gate 122*a* is passing SO1 through to gate 122*c*, to become S0.

Although block B4 was chosen to be the faulty element in this example, a similar analysis may be carried on for any of the other bit-planes containing the faulty element.

It is emphasized that the embodiment of FIGS. 8 and 9 does not restrict the possible implementation of the concept involved to just eight blocks, with one spare to handle a single fault. If there were *q* B-blocks and *m* spares, the switching could be arranged so as to handle up to and including *m* faulty B-blocks, by permitting the S and I-signals to enter any one of $m+1$ adjacent block positions.

Although the preferred embodiment described the partitioning of the error tolerant arithmetic logic unit into B-blocks which were one bit wide, this is in no way a restriction on the basic idea. When the B-block is defined in FIGS. 2 and 3, it is permissible to let $I_{1a}$ and $I_{1b}$ be two sets of inputs each of size, *k*, where *k* is at least 1. Then the block's second output, $O_1$, will also be a set of *k* data lines. The resulting variation on the remaining portions of the embodiment is to cause the input selection means and second output selection means to switch a set of *k* lines instead of a single line.

In the preferred embodiment, the electronic logical switches employed AND-OR circuits to perform selection gating and signal buffering. It should be understood that many logically equivalent switches exist (e.g. NAND-NAND, etc.) and could be substituted without changing either the gating and buffering function or the intent.

While the invention has been particularly shown and described with reference to a preferred embodiment thereof, it will be understood by those skilled in the art that various changes in form and details may be made therein without departing from the spirit and scope of the invention.

What is claimed is:

1. An error tolerant arithmetic logical unit comprising
   a plurality of normally operational vertical logic planes arranged in horizontal sequence to form a multi-bit position unit, each of said logic planes providing a single bit data path and first and second output signals,
   at least one spare vertical logic plane providing a spare bit path in said sequence,
   data input means to provide input data for said logic planes, said data input means including data input lines for each said normally operative logic plane and circuit means for directly connecting the data input lines for a logic plane adjacent to said spare logic plane to said spare logic plane,
   input selection means normally connecting said data input lines to said normally operational logic planes, said input selection means being operative to selectively connect the data input lines for any operational logic plane to one adjacent operational logic plane,
   control output means to receive the first output signal from the logic plane forming the last bit position for said unit,
   first output selection means normally connecting said first output signal from each operational logic plane as a control input signal to an adjacent operational logic plane and operating to bypass said spare logic plane, said first output selection means being operative to selectively bypass the first output signal of any logic plane around the next adjacent logic plane to the logic plane adjacent to the bypassed plane and to selectively connect the first output signal from either of the logic planes forming the last two bit positions to said control output means,
   control input means to provide a control input signal to the logic plane forming the first bit position,
   data output means including data output lines for each said normally operational logic plane, second output selection means normally connecting said operational logic planes to said data output lines, said second output selection means being operative to selectively connect the data output lines for any operational logic plane to one adjacent logic plane, and control means operable upon failure of one of said operational logic planes to cause said input and first and second output selection means to bypass said failed logic plane and substitute said spare logic plane.

2. The error tolerant arithmetic logical unit of claim 1 wherein said input selection means includes a number of input selection units totaling one less than the number of normally operative logic planes, each said input selection unit including at least one circuit formed by a buffering circuit connected to one of said logic planes, and a plurality of selection gates selectively operable to feed said buffering circuit, one of said selection gates being connected to receive input data for said one logic plane and the remaining selection gates being connected to receive input data for adjacent logic planes.

3. The error tolerant arithmetic logical unit of claim 2 wherein said first output selection means includes a control selection unit for each operational and spare logic plane, each said control selection unit including a gate/buffer circuit formed by a buffer circuit connected to each logic plane and a buffer circuit connected to said control output means, and a plurality of selection gates selectively operable to feed each said buffer circuit, one of said selection gates being connected to receive the first output signal from the preceding logic plane and the remaining selection gates being connected to receive the control input signals for the preceding logic planes.

4. The error tolerant arithmetic logical unit of claim 3 wherein said second output selection means includes an output selection unit for each operational logic plane, each said output selection unit including a gate/buffer circuit formed by a buffer circuit connected to each output line, and a plurality of selection gates selectively operable to feed said buffer circuit, one of said selection gates being connected to one of said logic planes to receive the second output signal therefrom and the remaining selection gates being connected to receive the second output signals from adjacent logic planes.

5. The error tolerant arithmetic logical unit of claim 4 wherein the data input means includes two data input lines for each normally operative logic plane, said input selection unit for each said normally operative logic plane including two of said gate/buffer circuits.

6. The error tolerant arithmetic logical unit of claim 4 wherein said control means includes a status register means having a bit position for each normally operative logic plane, each said bit position operating to provide a code and complement signal to operate the gating circuits for said input and first and second output selection means, said status register means being operable upon failure of a logic plane to effect substitution of said spare logic plane for the failed logic plane.

7. The error tolerant arithmetic logical unit of claim 6 which includes first function register means to provide an operational function code to control said logic planes, a second spare function register means, and function register selection means normally operative to pass the function code from said first function register means to said logic planes, said function register selection means including buffer circuit means connected to provide a function code to said logic planes and two selection gates connected to selectively drive each said buffer circuit means, one of said selection gates being connected to receive a function code from said first function register means and the remaining selection gate being connected to receive a function code from said spare function register means, said status register means having a function bit position to provide a code and complement signal to operate the selection gates of said function register selection means, said status register means being operable upon failure of one of said function register means to control the coding of said function bit position to effect substitution of said second spare function register means.

8. An error tolerant arithmetic logical unit for processing a multi-bit signal, said unit including a plurality of input terminals to which the bits of said signal are applied and a plurality of output terminals from which the bits of the processed signal are supplied, respectively, comprising a plurality of normally operational vertical logic bit-planes (B) arranged in horizontal sequence to form a multi-bit position module, the number of said normally operational bit-planes corresponding with the number of bits of said signal to be processed;

at least one spare vertical logic bit-plane for affording a spare bit path in said horizontal sequence, each of said normally operational and spare bit planes including data input and output terminals, and control signal input and output terminals;

input selection means for selectively connecting the multi-bit input terminals of said unit with the input terminals of a corresponding number of said bit-planes, respectively;

output selection means for selectively connecting the multi-bit output terminals of said unit with the output terminals of a corresponding number of said bit-planes, respectively;

bypass selection means for selectively connecting the control output terminal of each bit-plane alternately with the control input and control output terminals of the next successive bit-plane, said selection means being normally operable to de-activate said spare bit-plane and to activate said normally operational bit-planes; and means for operating said selection means to de-activate one of said normally operational bit-planes and to substitute said spare bit-plane therefor, thereby to effect conduction of said multi-bit signal through said vertical bit-planes and said control signal through said bit-plane horizontal sequence.

* * * * *